United States Patent [19]
Miyazaki et al.

[11] Patent Number: 5,880,561
[45] Date of Patent: Mar. 9, 1999

[54] DISCHARGE LAMP OPERATING APPARATUS AND METHOD FOR REDUCING DISCHARGE ARC CURVATURE

[75] Inventors: Kouji Miyazaki, Yawata; Satoshi Kominami, Katano; Shigeru Horii, Takatsuki, all of Japan

[73] Assignee: Matsushita Electric Industrial Co., Ltd., Osaka, Japan

[21] Appl. No.: 915,641

[22] Filed: Aug. 21, 1997

[30] Foreign Application Priority Data

Aug. 22, 1996 [JP] Japan ................................. 8-220938
Mar. 24, 1997 [JP] Japan ................................. 9-069502

[51] Int. Cl.⁶ .................................................. H05B 37/02
[52] U.S. Cl. ...................... 315/209 R; 315/246; 315/287
[58] Field of Search .................................... 315/246, 287, 315/326, 209 R; 313/637, 638, 639, 640, 641, 642

[56] References Cited

U.S. PATENT DOCUMENTS

| | | |
|---|---|---|
| 4,983,889 | 1/1991 | Roberts . |
| 5,121,034 | 6/1992 | Allen et al. . |
| 5,198,727 | 3/1993 | Allen et al. . |
| 5,270,620 | 12/1993 | Basch et al. ............................. 315/291 |
| 5,436,533 | 7/1995 | Fromm et al. . |

FOREIGN PATENT DOCUMENTS 713 352  5/1996  European Pat. Off. .

*Primary Examiner*—Don Wong
*Assistant Examiner*—David H. Vu
*Attorney, Agent, or Firm*—Wenderoth, Lind & Ponack, L.L.P.

[57] ABSTRACT

An apparatus for operating a high intensity discharge lamp that minimizes discharge arc curvature to form a straight discharge arc and thereby eliminate variations in the discharge arc color caused by cataphoresis is disclosed. The apparatus outputs a synthesize wave having a waveform with a frequency component of the acoustic resonance frequency to excite a mode straightening the discharge arc, and a waveform of a frequency less than the acoustic resonance frequency whereby the polarity of the waveform having a frequency less than the acoustic resonance frequency changes. The acoustic resonance frequency is determined by the speed of sound in the discharge space, and the length of the discharge space intersecting the discharge arc.

17 Claims, 14 Drawing Sheets

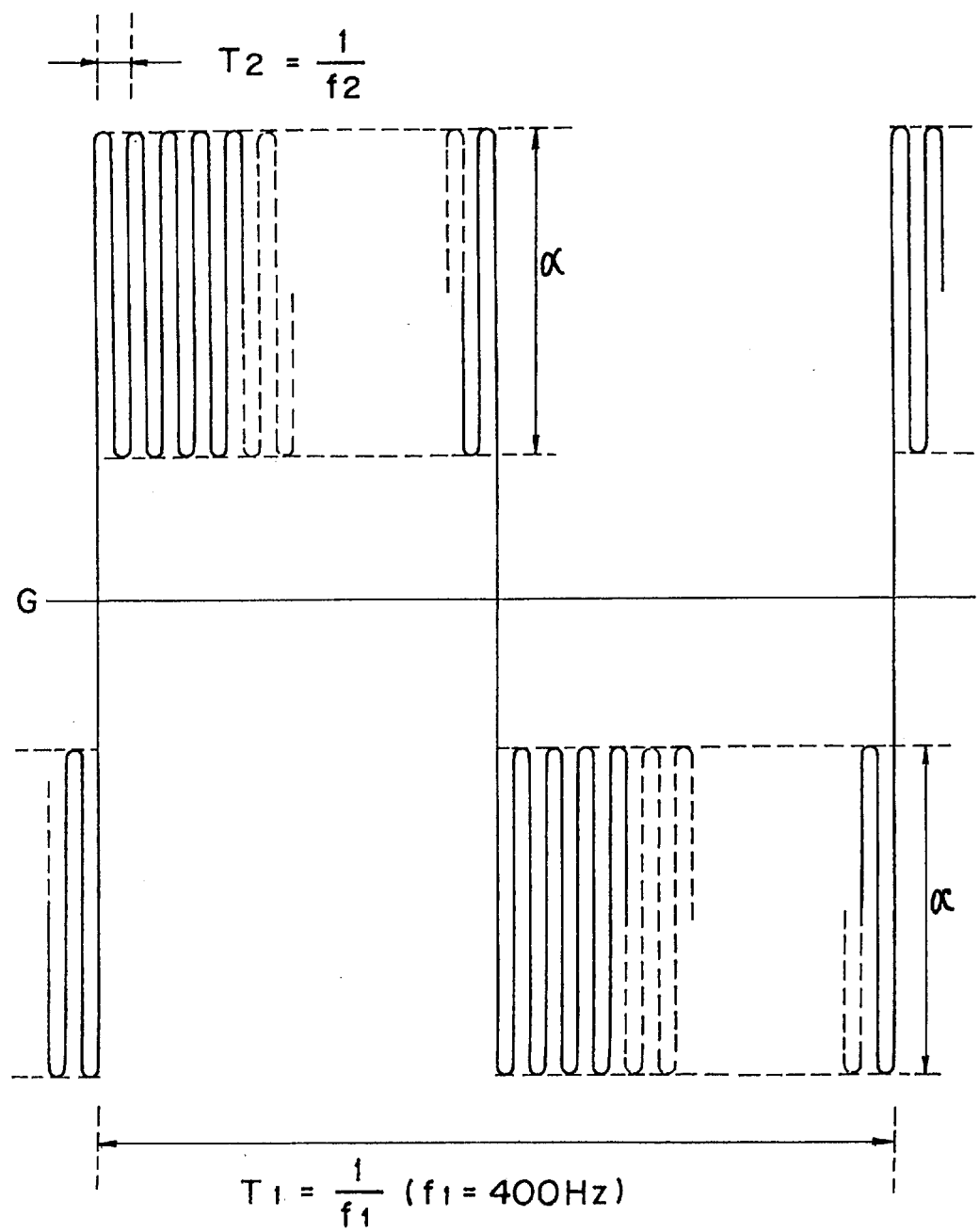

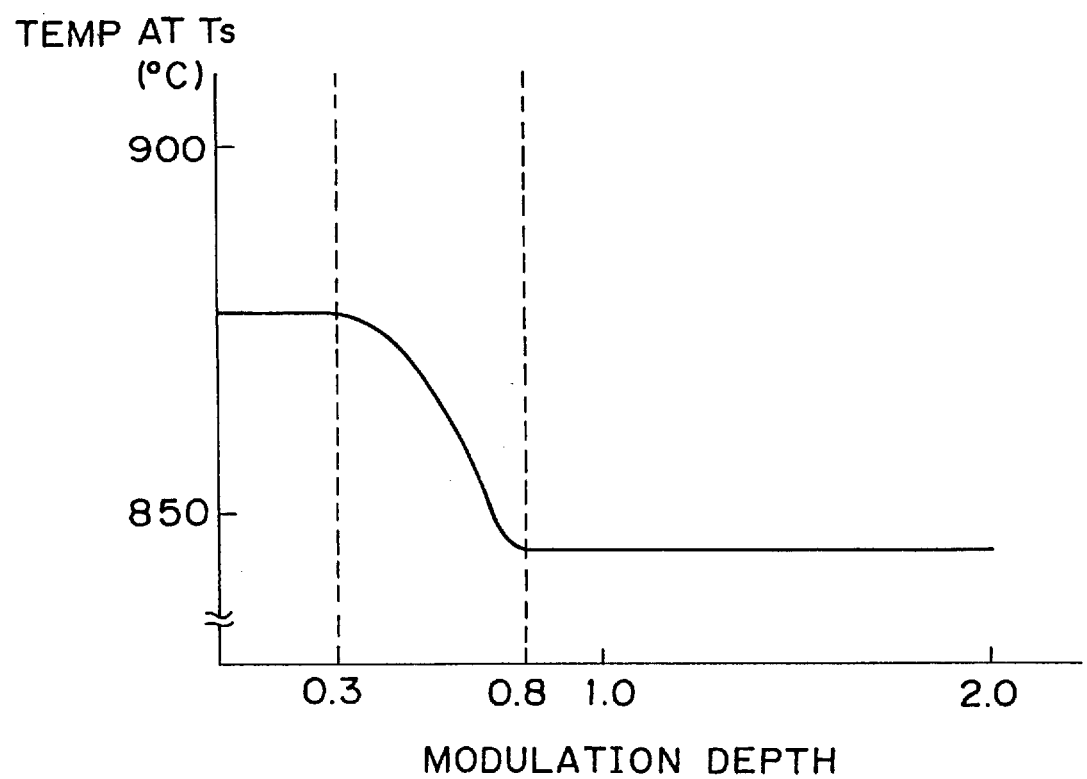

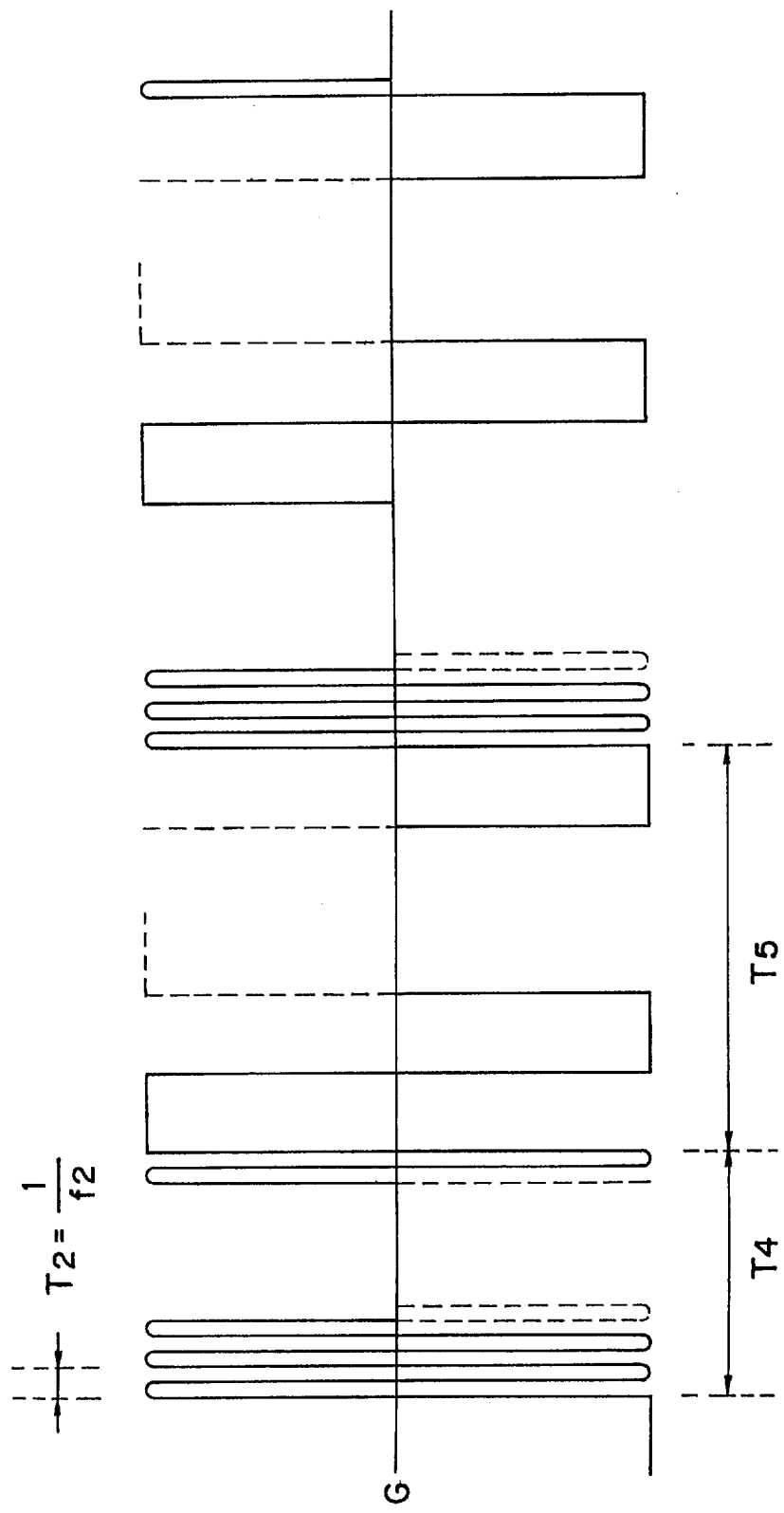

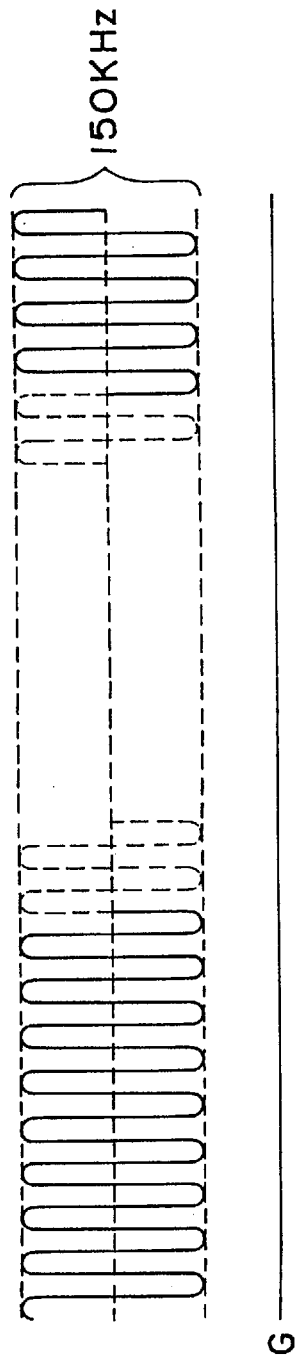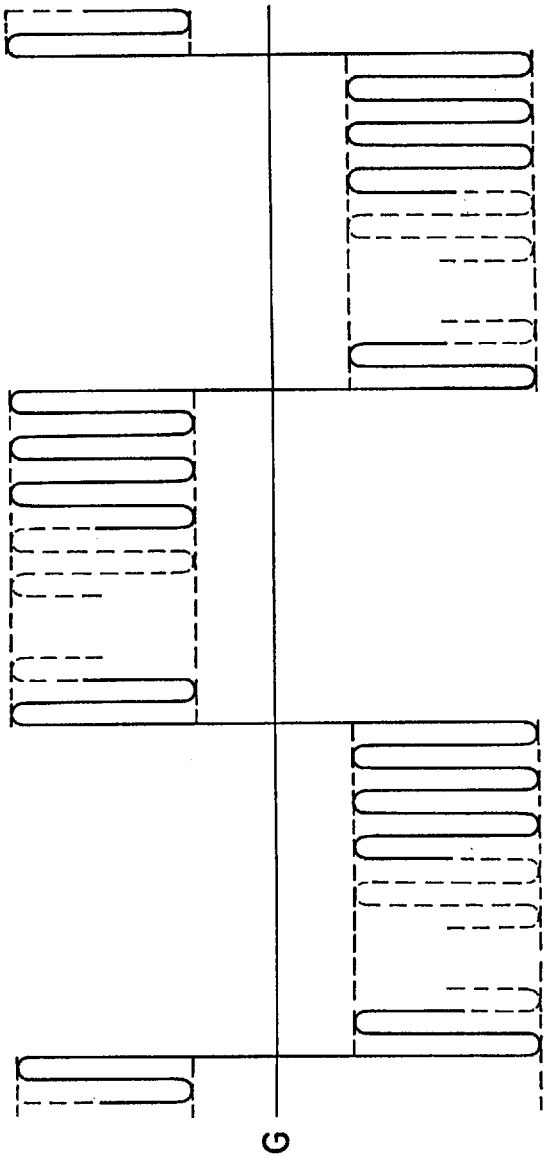
Fig. 12A
Fig. 12B

DISCHARGE LAMP OPERATING APPARATUS AND METHOD FOR REDUCING DISCHARGE ARC CURVATURE

BACKGROUND OF THE INVENTION

1. Field of the Invention

The present invention relates to a discharge lamp operating apparatus and method for reducing the discharge arc curvature caused by harmful gravity-induced convection when the discharge lamp is started horizontally (in a non-upright position), and relates particularly to a discharge lamp operating apparatus that is effective with high intensity discharge (HID) lamps.

2. Description of Related Technologies

HID lamps are widely used today for outdoor lighting because of their high luminous efficacy and long service life. The good color characteristics of metal halide lamps in particular have also led to their use for applications other than outdoor lighting, including interior lighting, light sources for audio-visual equipment, and even motor vehicle headlights.

A typical conventional HID lamp operating apparatus is described in the No. 10 Proceedings of the Light Association of Japan, Tokyo Branch. The discharge lamp operating apparatus described in these Proceedings enables stable operation and prevents discharge arc wandering, self-extinguishing, and lamp damage caused by the acoustic resonance unique to HID lamps by supplying a low frequency (several hundred hertz), rectangular wave current to the HID lamp, which is one type of discharge lamp.

While this type of igniter can light and then stably drive an HID lamp in a horizontal position, the effect of gravity-induced convection causes the discharge arc to curve upward in a bowed arc.

When the discharge arc curves, the temperature rise in the top part of the discharge space increases, thus deteriorating the quartz glass defining the discharge envelope, which is perceived as a loss of transparency, and shortening the service life of the lamp. Luminous efficacy also drops due to a drop in the lowest temperature at the bottom of the discharge space.

Metal halide lamps with a shorter arc length have been developed in recent years for use as light sources in audio-visual equipment and motor vehicle headlights, and shorter arc lengths require a higher mercury vapor pressure in the discharge space of the lighted lamp. Increasing the vapor pressure, however, increases gravity-induced convection, thereby increasing the curvature of the discharge arc and further degrading lamp life and efficacy.

The discharge lamp operating apparatus is disclosed in U.S. Pat. No. 5,198,727 issued to Allen et al. in which the above problem is addressed. The above problem is further described below with reference to FIG. 14.

As shown in FIG. 14, a waveform diagram of the lamp current of a discharge lamp driven by the discharge lamp operating apparatus disclosed in U.S. Pat. No. 5,198,727 teaches that curvature in the discharge arc can be reduced to obtain a substantially straight discharge arc by supplying to the lamp a current to which an ac wave 52 of a certain frequency has been superposed. This certain frequency is one that reduces the effects of gravity-induced convection in the discharge lamp fill on dc current 51 by means of acoustic resonance, and thus straightens the discharge arc.

Straightening the discharge arc reduces the temperature at the top of the discharge space, and thus alleviates one factor contributing to a shorter discharge lamp life. It is therefore possible to achieve a long-lasting discharge lamp and also improve luminous efficacy by raising the temperature of the lowest temperature in the bottom of the discharge space.

With a conventional discharge lamp operating apparatus as described above, however, current always flows in one direction in the discharge lamp, and while the field strength of the discharge space changes with a regular period, the field always moves in one direction. The fill distribution thus becomes unbalanced, and cataphoresis results in inconsistent arc coloring.

An asymmetrical temperature distribution along the electrode axis also occurs with a high temperature on the anode side and a low temperature on the cathode side. As a result of this asymmetrical temperature distribution, the effect of superposing a frequency that excites an arc-straightening mode is small, although the curvature of the discharge arc is still somewhat reduced.

A discharge lamp operating apparatus is also disclosed in the applicant's prior U.S. application Ser. No. 08/560,683 filed Nov. 20, 1995 and entitled "DISCHARGE LAMP-LIGHTING APPARATUS" (corresponding to European Patent publication No. 0713352 published May 22, 1996). The inventors of U.S. application Ser. No. 08/560,683 are the three present inventors and Makoto Horiuchi and Ryuji Higuchi.

SUMMARY OF THE INVENTION

The object of the present invention is therefore to resolve these problems by providing a discharge lamp operating apparatus for operating a high intensity discharge lamp that minimizes discharge arc curvature to form a substantially straight discharge arc, eliminates variations in the discharge arc color, and avoids cataphoresis.

To achieve this object, according to the present invention, a discharge lamp operating apparatus for operating a discharge lamp having a glass envelope defining a discharge space, comprises:

a generator for generating a first wave signal having a waveform with an acoustic resonance frequency exciting a discharge arc straightening mode, the first wave signal having a center line at a constant level; and a modulator for modulating the first wave signal to vary periodically such that the center line varies alternately to change the polarity thereof at a modulating frequency, the modulating frequency being smaller than the acoustic resonance frequency, the modulator producing a modulated signal According to the present invention, a discharge lamp operating apparatus for operating a discharge lamp having a glass envelope defining a discharge space, comprises:

a generator for generating a first wave signal having a waveform with an acoustic resonance frequency exciting a discharge arc straightening mode, the first wave signal having a center line at a constant level; and a modulator for modulating the first wave signal to appear periodically such that the first wave signal and a second wave signal occurring alternately in a time sharing manner, the second wave signal having a frequency smaller than the acoustic resonance frequency.

According to the present invention, a discharge lamp operating method for operating a discharge lamp having a glass envelope defining a discharge space, the method comprises:

generating a first wave signal having a waveform with an acoustic resonance frequency exciting a discharge arc straightening mode, the first wave signal having a center line at a constant level; and modulating the first wave signal to vary periodically such that the center line varies alternately to change the polarity thereof at a modulating frequency, the modulating frequency being smaller than the acoustic resonance frequency, the modulator producing a modulated signal.

According to the present invention, a discharge lamp operating method for operating a discharge lamp having a glass envelope defining a discharge space, said method comprises:

generating a first wave signal having a waveform with an acoustic resonance frequency exciting a discharge arc straightening mode, the first wave signal having a center line at a constant level; and modulating the first wave signal to appear periodically such that the first wave signal and a second wave signal occurring alternately in a time sharing manner, the second wave signal having a frequency smaller than the acoustic resonance frequency.

BRIEF DESCRIPTION OF THE DRAWINGS

The present invention will become more fully understood from the detailed description given below and the accompanying diagrams wherein:

FIG. 1 is a waveform diagram of a composite wave comprising a rectangular wave of frequency f1 and a sine wave of acoustic resonance frequency f2 where the acoustic resonance frequency f2 excites a mode straightening the discharge arc.

FIG. 3 is a graph showing the change in the arc tube top surface temperature as the modulation depth is changed.

FIG. 6 is a waveform diagram of a composite wave comprising a rectangular wave and a sine wave of acoustic resonance frequency f2 where the acoustic resonance frequency f2 excites a mode straightening the discharge arc.

FIGS. 12A and 12B are waveform diagrams of the output of DC power supply 41, and the output of rectangular wave conversion circuit 14, respectively, in the circuit diagram of FIG. 11.

DESCRIPTION OF PREFERRED EMBODIMENTS

Figure 2A:
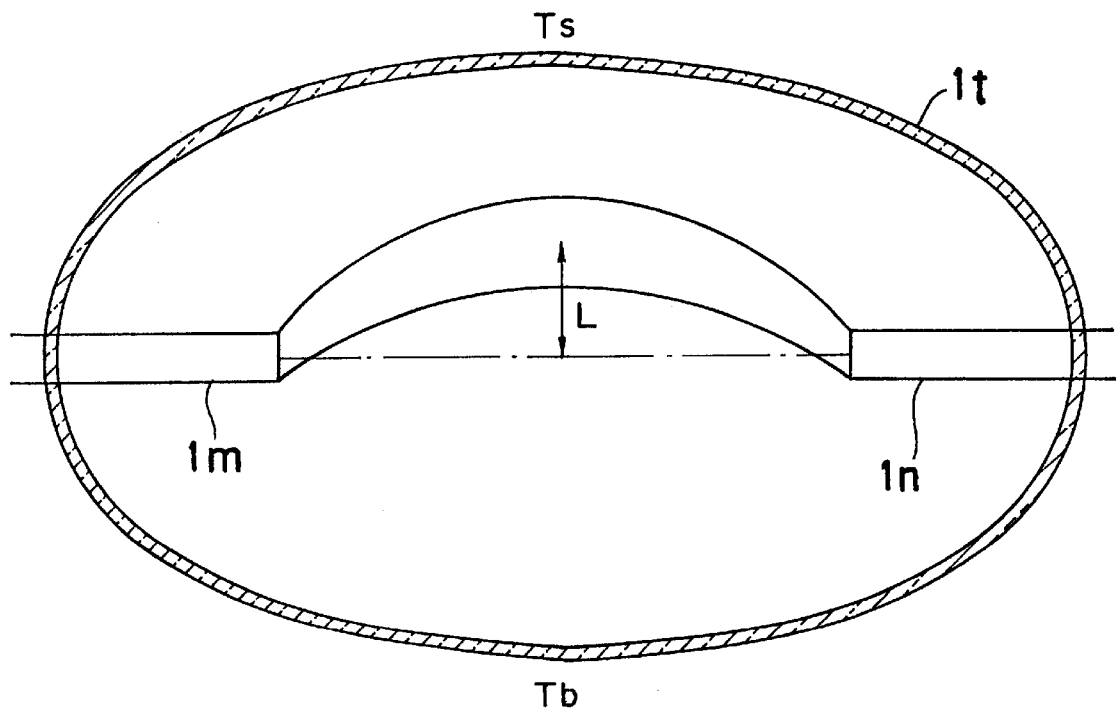
FIG. 2A is a diagram showing the discharge lamp with a curved discharge arc.

FIG. 1 is a waveform diagram of a composite wave comprising a superposed sine wave of acoustic resonance frequency f2 and a rectangular wave of frequency f1 (400 Hz in this exemplary embodiment). Note that acoustic resonance frequency f2 is a frequency exciting an arc-straightening mode, frequency f1 is lower than acoustic resonance frequency f2, and polarity changes in the rectangular wave. In the drawings showing wave forms, G represents the ground level, which is 0 volts.

A deviation amount L, i.e., the change in the size of the discharge arc curvature, and a surface temperature of the lamp tube 1t at a location Ts shown in FIG. 2A are experimentally measured by supplying a current having a waveform such as shown in FIG. 1 to a discharge lamp while varying a difference α (a peak-to-peak value) of the sine wave component of acoustic resonance frequency f2. The results of these tests are described below.

Two discharge lamps, specifically a 35-W metal halide lamp and a 200-W metal halide lamp, were tested and started in a horizontal, or non-upright, position, as shown in FIG. 2A, and a current wave such as shown in FIG. 1 was supplied. A modulation depth α/β, in which β is an effective value of the composite wave, was varied. The distance L between the arc center and an electrode axis with a cross section perpendicular to an electrode axis between the lamp electrodes 1m and 1n was then measured in each lamp at the various modulation depths α/β. The results of these measurements are shown in FIG. 2B.

It should be noted that the acoustic resonance frequency f2 in these tests was approximately 150 kHz for the 35-W metal halide lamp, and approximately 32 kHz for the 200-W metal halide lamp in these experiments.

Figure 2B:
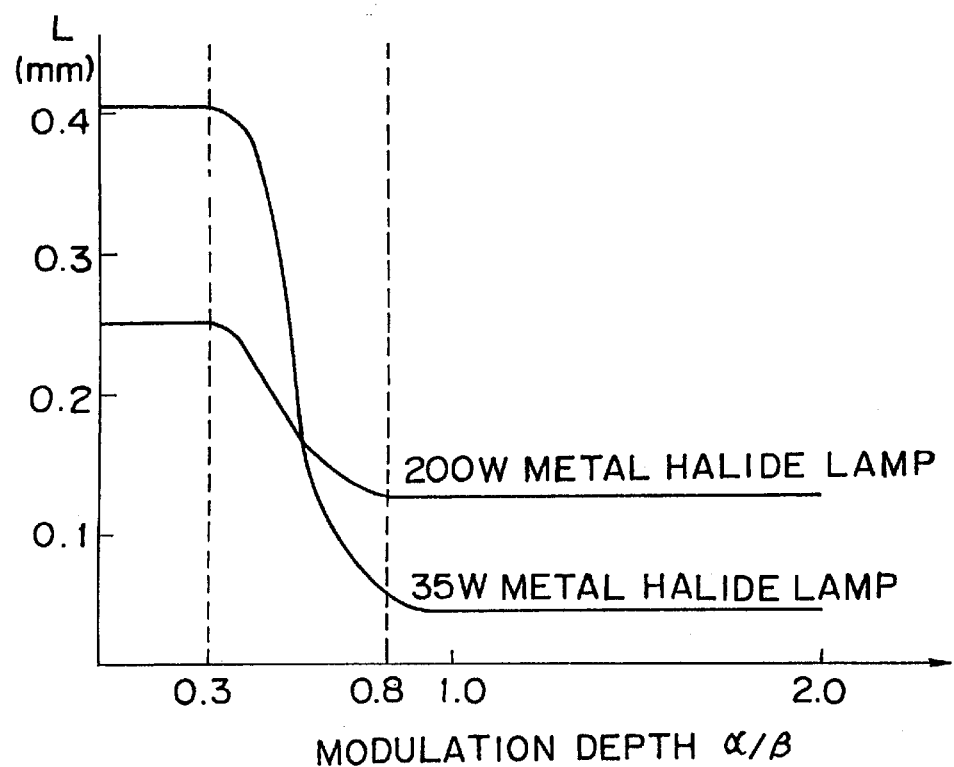
FIG. 2B is a graph showing the change in the distance between the electrode axis and the arc center as the modulation depth is changed.

As apparent from FIG. 2B, the distance L between the discharge arc center and the electrode decreased in both lamps at a modulation depth of at least 0.3.

The electrode-arc distance L was the smallest in both lamps at a modulation depth of 0.8 or greater with a substantially straight arc observed.

Therefore, according to the present invention, the modulation depth α/β: should preferably be not less than 0.3, and more preferably be not less than 0.8.

The surface temperature at the point Ts, i.e., the top of the arc tube 1t at a cross section perpendicular to an electrode axis between the lamp electrodes 1m and 1n was then measured in the 200-W metal halide lamp while supplying a current wave such as shown in FIG. 1 and varying the modulation depth. The results of these measurements are shown in FIG. 3.

As shown in FIG. 3, the arc tube top surface temperature drops gradually at a modulation depth above approximately 0.3 because the discharge arc curvature gradually decreases. The surface temperature is lowest at the modulation depth at which the discharge arc becomes substantially straight, i.e., 0.8 and above. It should also be noted that the surface temperature at a point Tb, i.e., the bottom of the arc tube $1t$ tends to rise gradually at a modulation depth of 0.3 or greater.

The tests described above thus teach that the temperature of the highest temperature point at the top of the arc tube can be decreased with a modulation depth of 0.3 or greater because the discharge arc curvature can be reduced. Because a high temperature at the top of the arc tube is one factor contributing to a shorter discharge lamp life, lamp life can also be improved.

These tests also teach that luminous efficacy can be improved because the lowest temperature point at the bottom of the discharge space can be raised. In other words, the temperature distribution around the arc tube can be made uniform.

The distance L is also minimized at a modulation depth of 0.8 or greater because the discharge arc becomes substantially straight. The effects described above are thus even more pronounced.

Applying a composite wave comprising an acoustic resonance frequency component and 400 Hz rectangular wave as shown in FIG. 1 also causes the polarity of the lamp current to change at the cycle of the rectangular wave, and thus causes the polarity of the field produced in the discharge space to change periodically. Cataphoresis is thus prevented, discoloration of the discharge arc can be prevented, and the temperature distribution along the electrode axis can be made symmetrical to the electrode gap center. It is therefore possible to achieve less curvature of the discharge arc.

Additional studies were also conducted to measure the arc tube top surface temperature using a constant modulation depth and varying only the frequency f1 of the rectangular wave.

Figure 4:
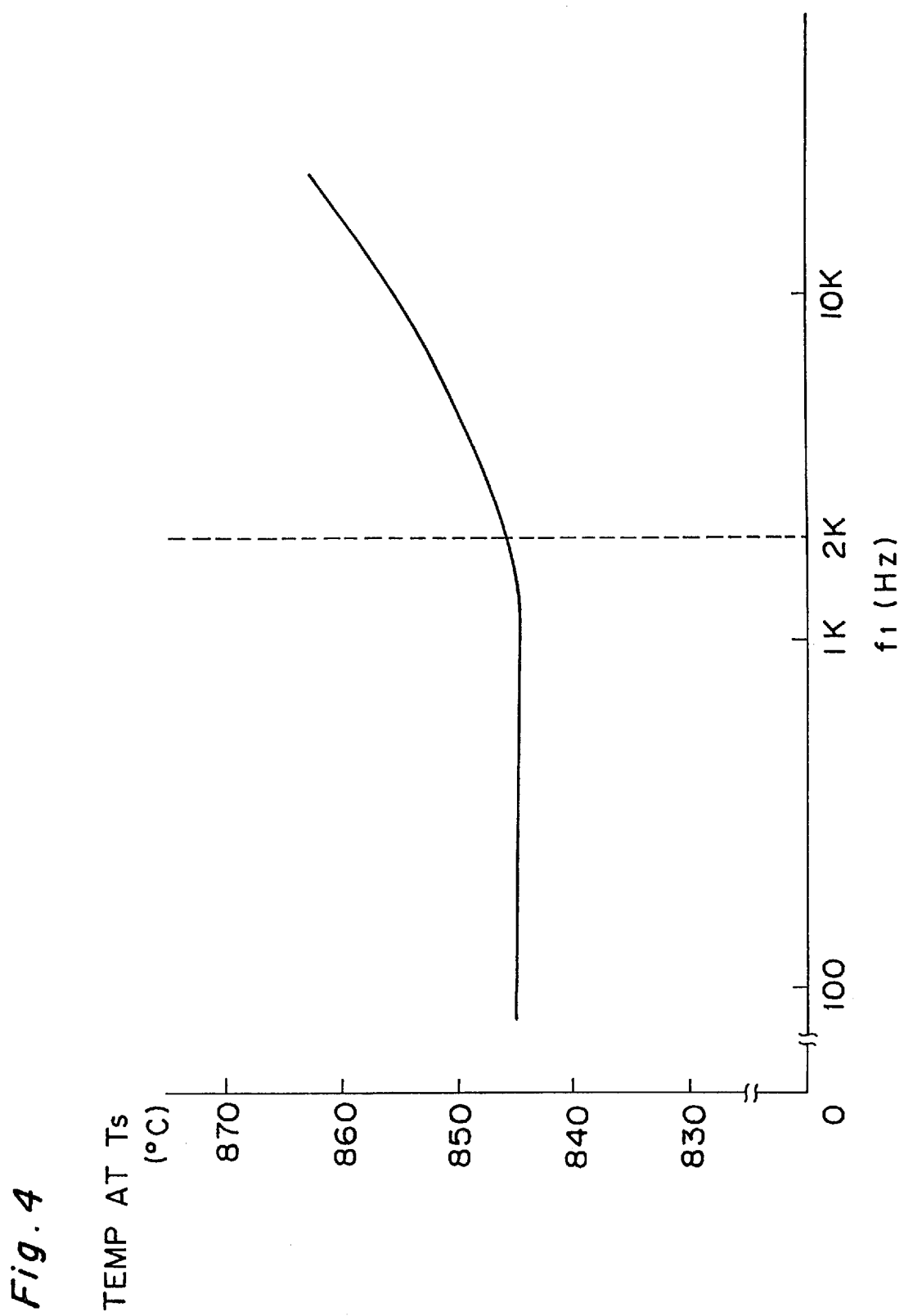
FIG. 4 is a graph showing the change in the arc tube top surface temperature as the rectangular wave frequency f1 is changed.

The results of arc tube top surface temperature measurements taken while applying a rectangular wave current as shown in FIG. 1 to a 200-W metal halide lamp at a constant 1.0 modulation depth and variable rectangular wave frequency f1 are shown in FIG. 4.

As FIG. 4 teaches, the arc tube top surface temperature tends to rise when the rectangular wave frequency f1 exceeds 2 kHz. As taught by FIG. 3, this means that the discharge arc curvature increases.

Furthermore, while the temperature is substantially constant at a relatively low level at a rectangular wave frequency f1 below approximately 2 kHz, changes in the lamp current polarity at below approximately 100 Hz produce noticeable flicker. As a result, the rectangular wave frequency f1 is preferably between 100 Hz and 2 kHz.

Figure 5:
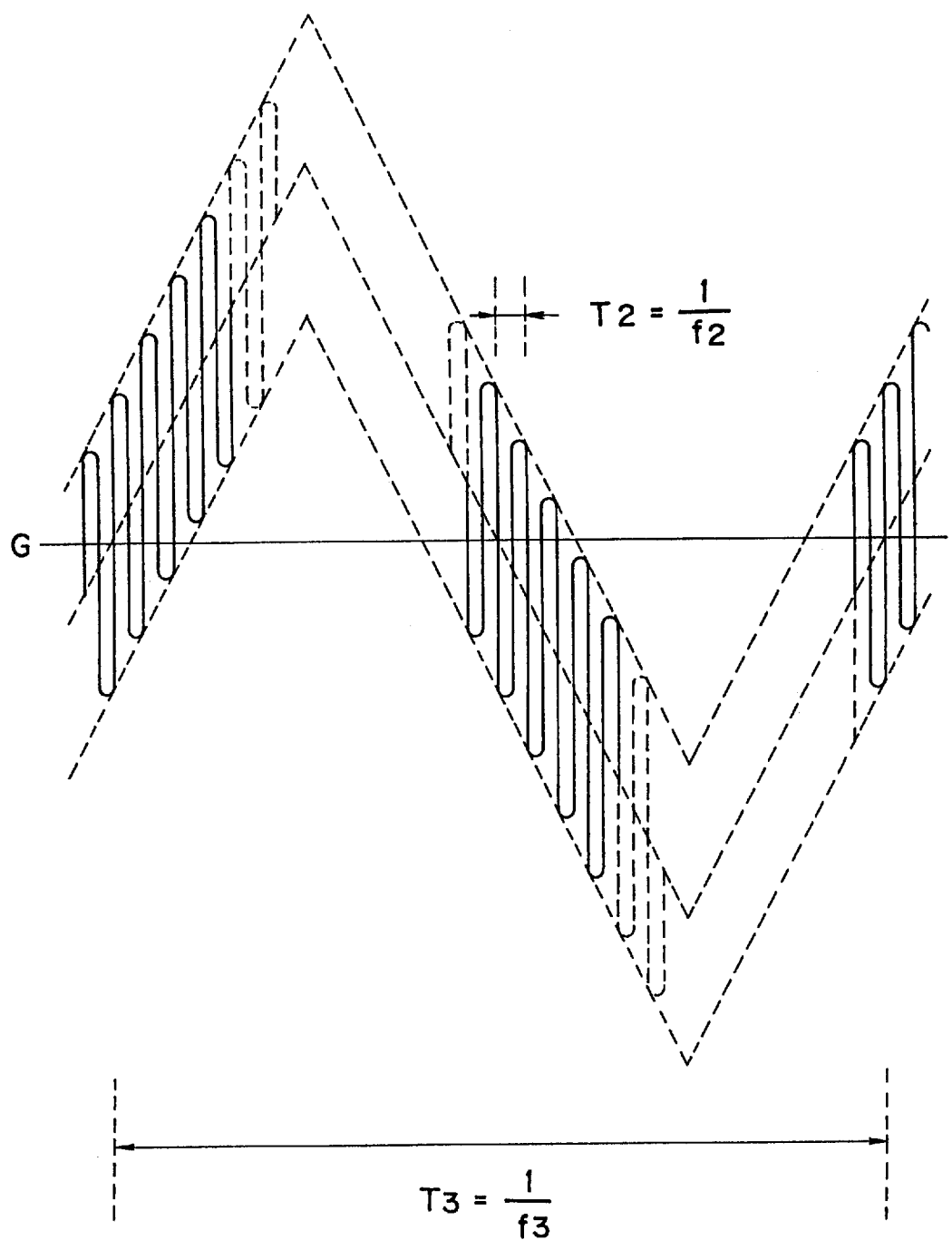
FIG. 5 is a waveform diagram of a composite wave comprising a triangular wave of frequency f3 and a sine wave of acoustic resonance frequency f2 where the acoustic resonance frequency f2 excites a mode straightening the discharge arc.

FIG. 5 is a waveform diagram of a composite wave comprising a superposed sine wave of acoustic resonance frequency f2 and triangular wave of frequency f3. Note that acoustic resonance frequency f2 is a frequency exciting an arc-straightening mode, frequency f3 is lower than acoustic resonance frequency f2, and polarity changes in the triangular wave.

Similar experiments further demonstrated that the discharge arc curvature can be reduced when a current with the waveform as shown in FIG. 5 is supplied to the lamp, and that a substantially straight discharge arc can be achieved by increasing the modulation depth.

Cataphoresis can also be prevented because the polarity of the field produced in the discharge space changes at a period determined by frequency f3. Discoloration of the discharge arc can therefore be prevented. The temperature distribution along the electrode axis can also be made symmetrical to the electrode gap center, and the discharge arc curvature can therefore be reduced.

FIG. 6 is a waveform diagram of a composite wave comprising a sine wave of acoustic resonance frequency f2 and rectangular wave of a frequency lower than acoustic resonance frequency f2 added in a time sharing manner. Here also, the polarity of the waveform having acoustic resonance frequency f2 changes. Note that sine wave and rectangular wave occur alternately by adjusting respective periods T4 and T5.

Further experiments also demonstrated that discharge arc curvature can be reduced when a current with the waveform as shown in FIG. 6 is supplied to the lamp, and that a substantially straight discharge arc can be achieved by increasing the ratio of time T4 to time T5, or the ratio of an occurring period of the first wave signal within a unit time.

The preferred embodiments of the present invention are described next below with reference to the accompanying figures.

Embodiment 1

Figure 7A:
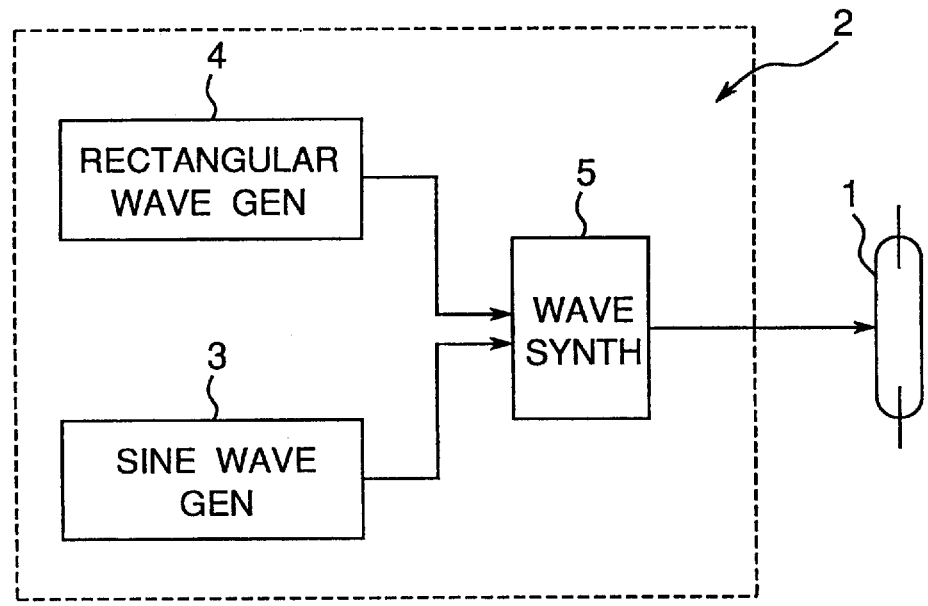
FIG. 7A is a block diagram of a discharge lamp operating apparatus according to a first embodiment of the present invention.

FIG. 7A is a block diagram of a discharge lamp operating apparatus 2 according to a first embodiment of the present invention for application with a 35-W metal halide lamp 1. It should be noted that the 35-W metal halide lamp 1 in this embodiment is a discharge lamp having a fill of mercury and the metal halide sodium iodide and scandium iodide is sealed in a glass envelope defining the discharge space.

The operating apparatus 2 supplies current of a particular waveform to 35-W metal halide lamp 1 to start and drive the lamp.

The operating apparatus 2 comprises a 150-kHz sine wave generator 3, a 400-Hz rectangular wave generator 4, and a wave synthesizer 5.

The sine wave generator 3 is an AC power supply that outputs a waveform with a frequency component of the acoustic resonance frequency for exciting an arc-straightening mode. The rectangular wave generator 4 is a polarity-changing power supply for outputting a waveform with a frequency lower than the acoustic resonance frequency and used to change the polarity of the waveform having the acoustic resonance frequency. The wave synthesizer 5 then superposes the output from the sine wave generator 3 with the output from the rectangular wave generator 4 to generate the waveform supplied to the 35-W metal halide lamp 1.

Figure 8A:
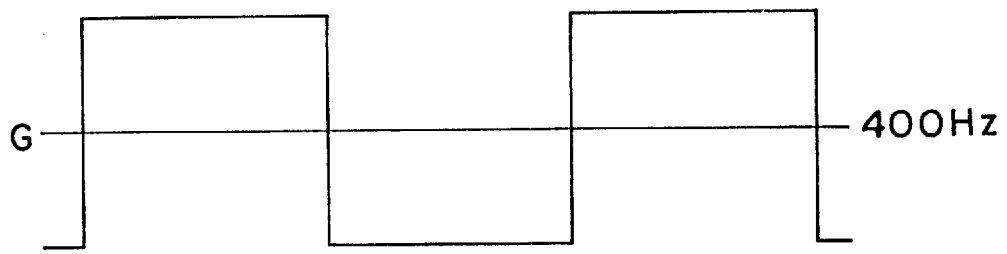
FIGS. 8A, 8B and 8C are waveform diagrams of the output of rectangular wave generator 4, the output of sine wave generator 3, and the output of wave synthesizer 5, respectively, in the block diagram of FIG. 7A.
Figure 8B:
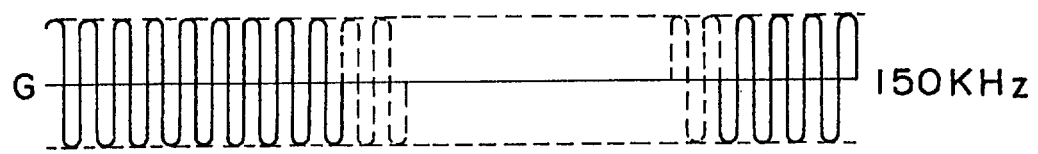
Figure 8C:
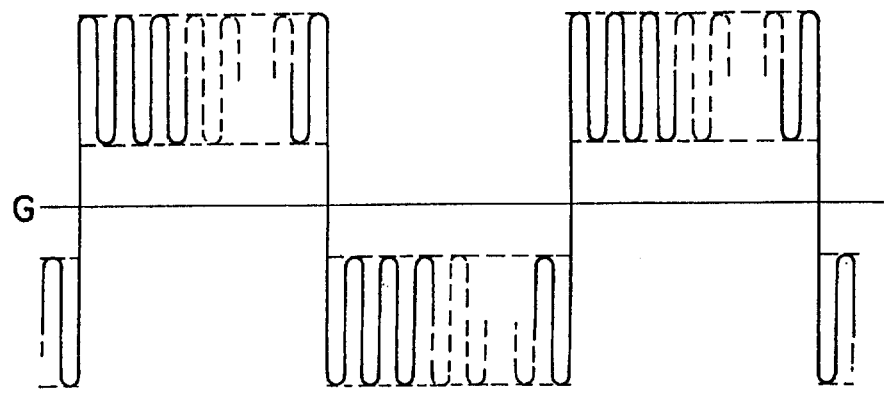

The waveforms output by the sine wave generator 3, rectangular wave generator 4, and wave synthesizer 5 above according to the first embodiment of the present invention are shown in FIGS. 8A, 8B and 8C. Specifically, FIG. 8A shows the 400-Hz rectangular wave output by the rectangular wave generator 4. FIG. 8B shows the 150-kHz sine wave output by the sine wave generator 3. FIG. 8C shows the superposed waveform generated by the wave synthesizer 5 from the output of the sine wave generator 3 and the output of the rectangular wave generator 4. The waveform shown in FIG. 8C is applied to the 35-W metal halide lamp.

It is therefore possible by the operating apparatus 2 shown in FIG. 7A to apply to the 35-W metal halide lamp 1 a composite wave having, as shown in FIG. 8C, a superposed 400-Hz rectangular wave and a sine wave of an acoustic resonance frequency, which is preferably 150-kHz in this exemplary embodiment, for exciting an arc-straightening mode. A substantially straight discharge arc free of discoloration can therefore be achieved.

Figure 7B:
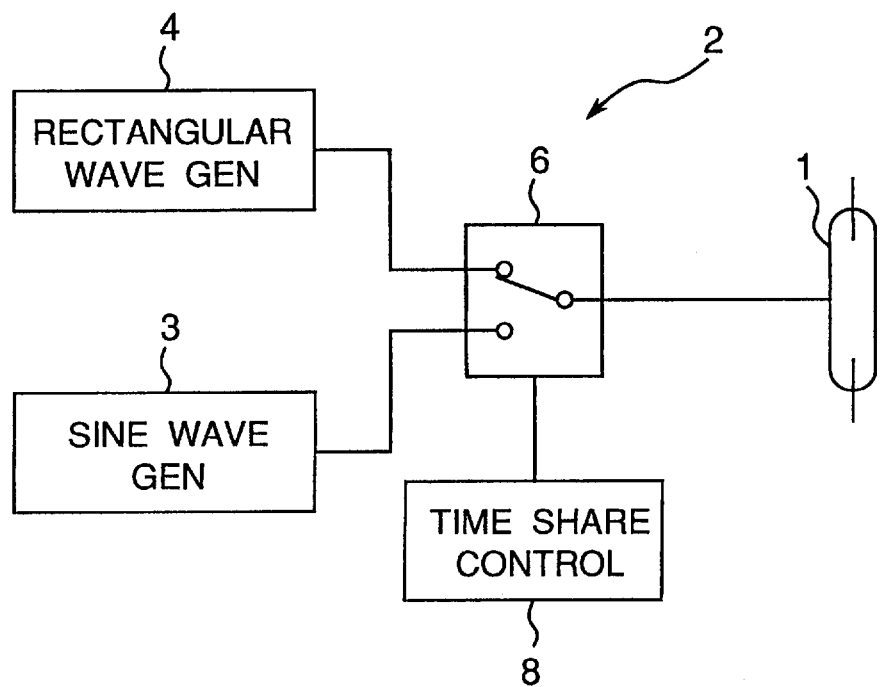
FIG. 7B is a block diagram showing a modification of a discharge lamp operating apparatus shown in FIG. 7A.

FIG. 7B is a block diagram of a discharge lamp operating apparatus 2 which is a modification of that shown in FIG. 7A. Instead of wave synthesizer 5, the discharge lamp operating apparatus 2 of FIG. 7B has a switch 6 and a time share control 8. The time share control 8 controls the switching rate, such as T4 and T5 shown in FIG. 6, and switch 6 changes its position alternately according to the switching rate. Thus, a waveform as shown in FIG. 6 is applied to the 35-W metal halide lamp.

It should be noted that the shape of the discharge arc can be changed continuously from a curved discharge arc to a straight arc. This can be accomplished by controlling the time share control 8 to increase or decrease the apply time of the output from the sine wave generator 3 relative to the output from the rectangular wave generator 4 in the composite wave.

Figure 13:
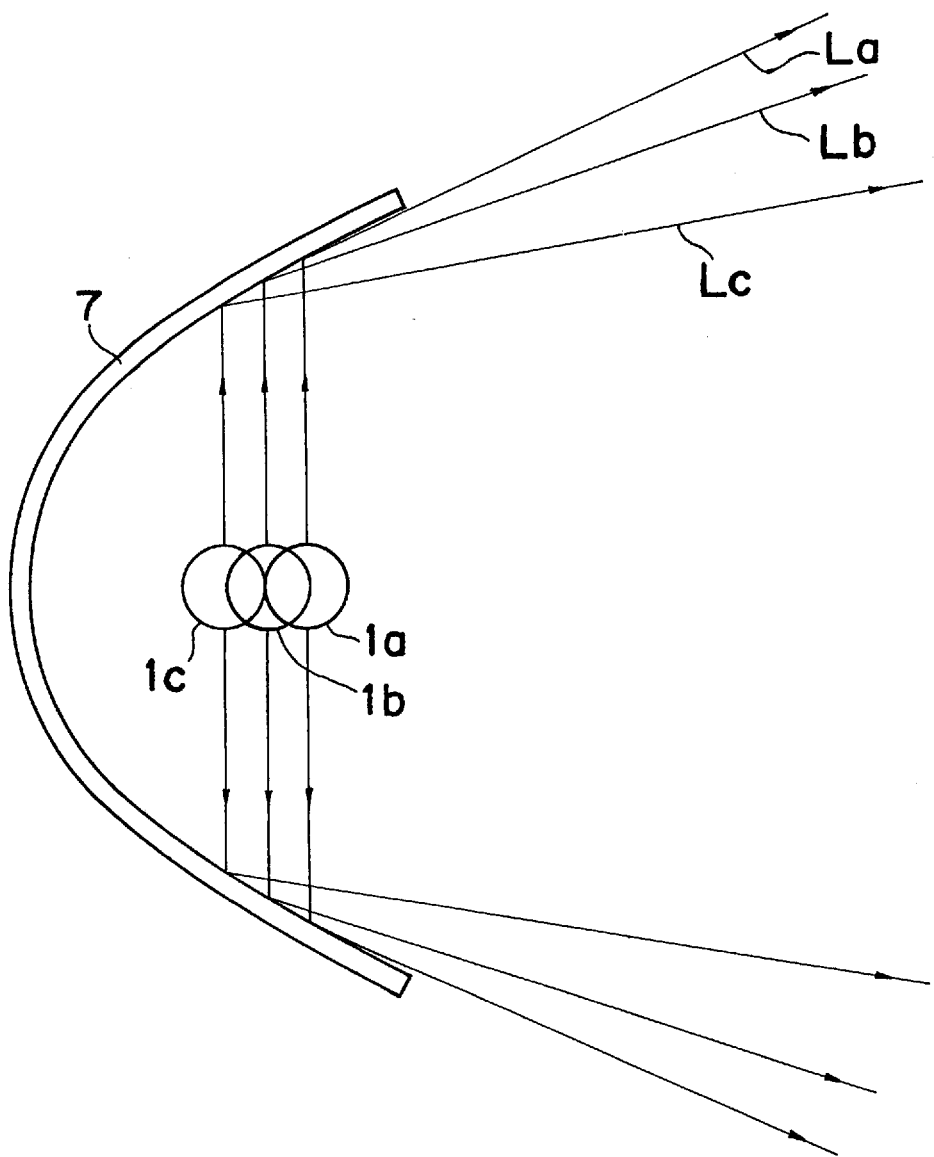
FIG. 13 is a diagram showing discharge arc position with respect to a reflection mirror.
Figure 14:
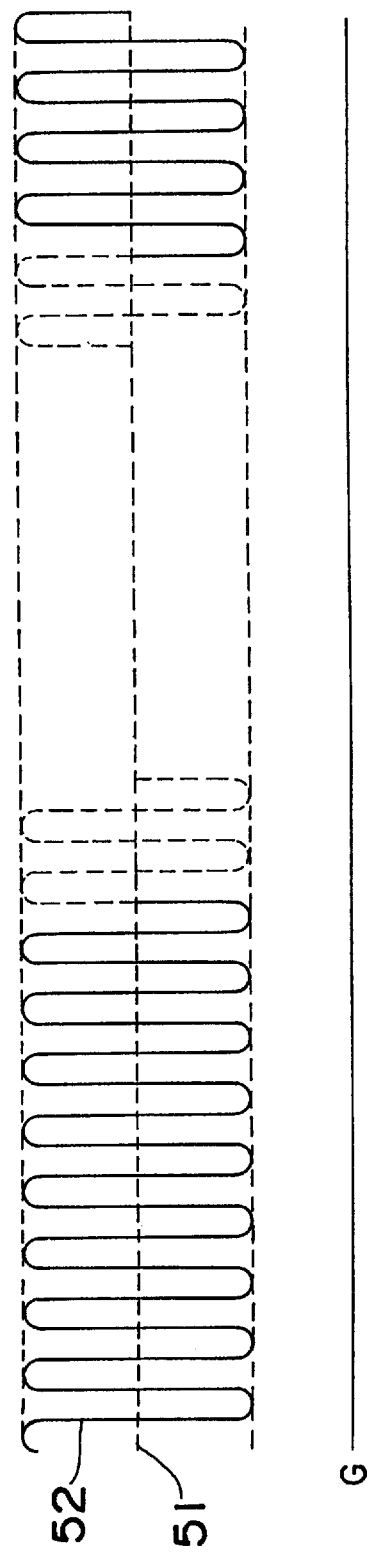
FIG. 14 is a waveform diagram of the lamp current when a discharge lamp is energized by a prior art discharge lamp operating apparatus.

As shown in FIG. 13, by thus varying the discharge arc, the operating effects achieved by emitting the light from the 35-W metal halide lamp 1 off a reflection mirror can be changed. In other words, the position of the discharge arc can be changed among various positions, such as positions 1a, 1b and 1c shown in FIG. 13. Such an arc position change results in light emitting angle, as shown by lines La, Lb and Lc, relative to the reflection mirror 7.

With the discharge lamp operating apparatus 2 shown in FIG. 7A, the change of the discharge arc position can be accomplished by changing any parameter in the modulation depth $\alpha/\beta$.

Embodiment 2

Figure 9:
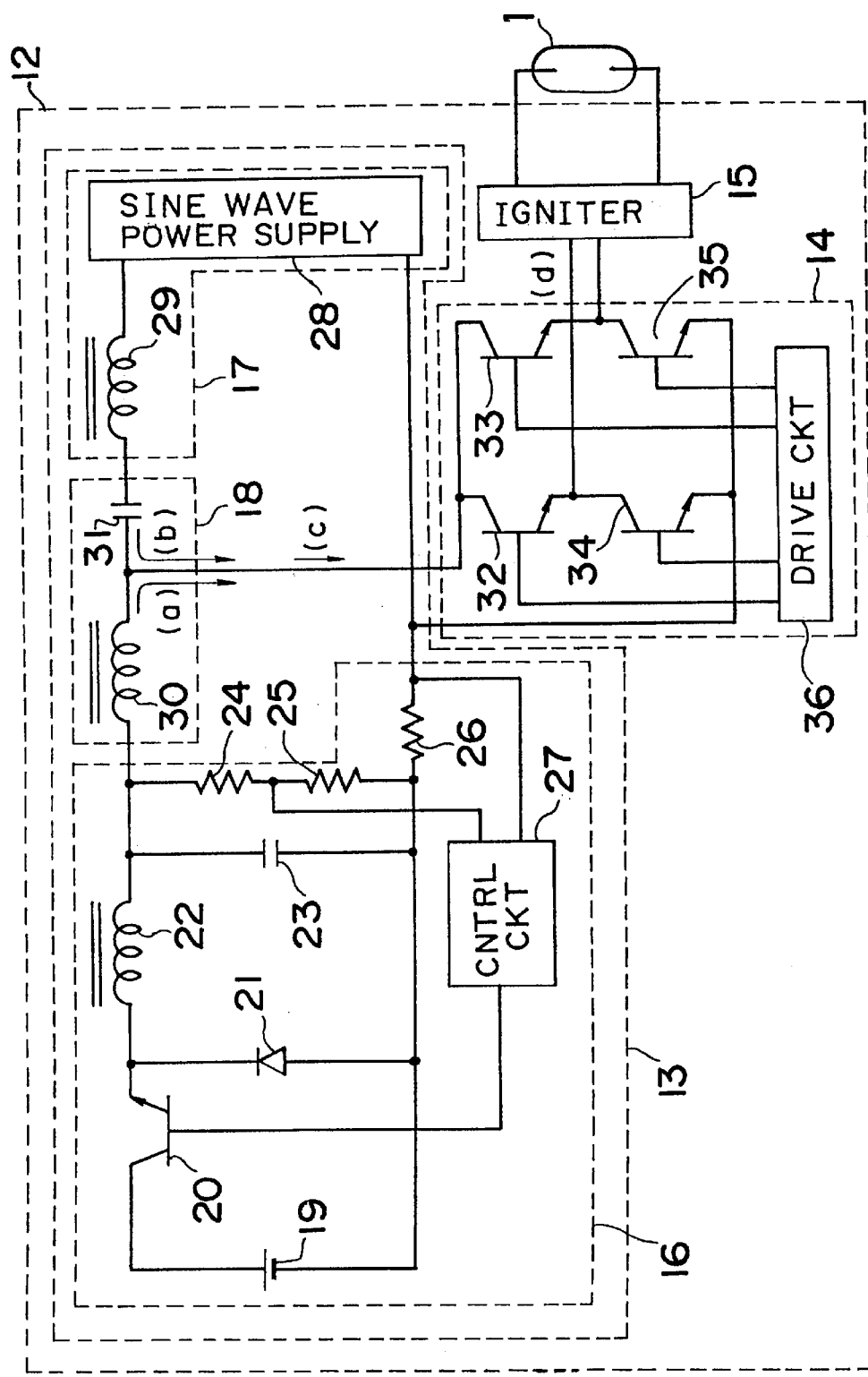
FIG. 9 is a circuit diagram of a discharge lamp operating apparatus according to a second embodiment of the present invention.

FIG. 9 is a block diagram of a discharge lamp operating apparatus 12 according to a second embodiment of the present invention for application with a 35-W metal halide lamp 1, which is identical to the lamp 1 shown in FIG. 7A.

The discharge lamp operating apparatus 12 in this case comprises a DC power supply 13, rectangular wave conversion circuit 14, and igniter 15.

The DC power supply 13 outputs a DC waveform superposed with a waveform comprising a frequency component of the acoustic resonance frequency for exciting an arc-straightening mode. The rectangular wave conversion circuit 14 is an inverter circuit for changing the polarity of the output from the DC power supply 13 at a frequency lower than the acoustic resonance frequency. The igniter 15 is a igniter for applying a high voltage sufficient to cause the 35-W metal halide lamp 1 to start discharging.

The DC power supply 13 comprises a DC supply 16, high frequency supply 17, and superposing circuit 18. The DC supply 16 outputs a DC waveform in which there is no change in the instantaneous value over time. The high frequency supply 17 is an AC power supply B that outputs a sine wave with a frequency component of the acoustic resonance frequency (150-kHz) for exciting an arc-straightening mode. The superposing circuit 18 superposes the output of the high frequency supply 17 on the output of the DC supply 16.

The DC supply 16 comprises a voltage step-down chopper circuit comprising DC source 19, transistor 20, diode 21, choke coil 22, and capacitor 23, a lamp voltage detector comprising resistances 24 and 25 for detecting a signal representing the lamp voltage, a lamp current detector comprising resistance 26 for detecting a signal representing the lamp current, and a control circuit 27. The control circuit 27 calculates the lamp power from the lamp voltage signal and the lamp current signal, and controls the on/off ratio of transistor 20 to maintain the lamp power at a constant 35 W.

The high frequency supply 17 comprises a sine wave power supply 28 for outputting an acoustic resonance frequency sine wave, and a choke coil 29 for limiting the output voltage of the sine wave power supply 28 to a particular modulation depth. The high frequency supply 17 thus outputs a sine wave of a specific acoustic resonance frequency.

The superposing circuit 18 comprises a choke coil 30 and a capacitor 31. The capacitor 31 blocks the DC current output from the DC supply 16 from flowing to the high frequency supply 17, and the choke coil 30 blocks the AC output from the high frequency supply 17 from flowing to the DC supply 16. The output terminal of the superposing circuit 18 is taken from the line connecting the choke coil 30 and capacitor 31, and the superposing circuit 18 thus outputs a DC current with a superposed acoustic resonance frequency sine wave.

Figure 10A:
FIGS. 10A, 10B, 10C and 10D are waveform diagrams of the output of DC supply 16, the output of high frequency supply 17, the output of superposing circuit 18, and the output of rectangular wave conversion circuit 14, respectively, in the circuit diagram of FIG. 9.

The output current from DC supply 16 is applied to the choke coil 30 which cuts off AC component, and produces a DC signal (a), such as shown in FIG. 10A. As shown in FIG. 10A, the DC current output is flat with no change in instantaneous value.

Figure 10B:
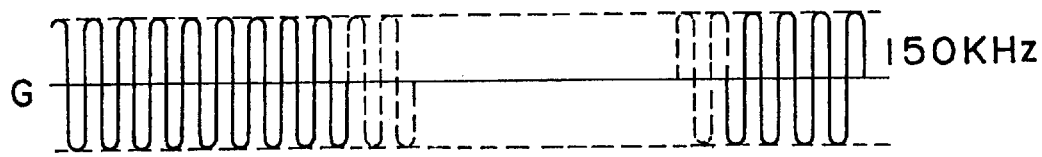

The output current from high frequency supply 17 is applied to the capacitor 31 which cuts off DC component, and produces an AC signal (b), such as shown in FIG. 10B.

Figure 10C:
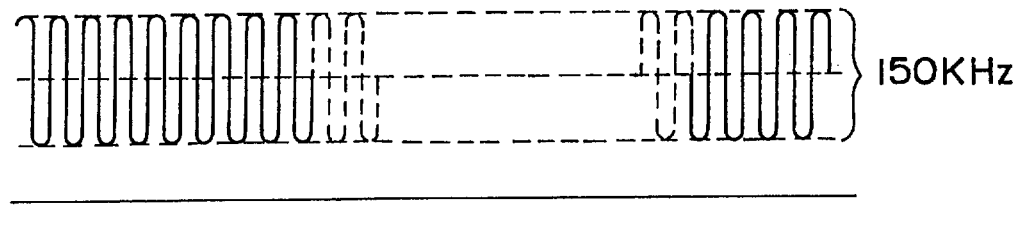

The signals (a) and (b) are superposed in the superposing circuit 18 which produces a superposed signal (c), as shown in FIG. 10C.

The rectangular wave conversion circuit 14 comprises transistors 32, 33, 34, and 35, and drive circuit 36. The rectangular wave conversion circuit 14 alternately controls the ON time of transistors 32 and 35, and the ON time of transistors 33 and 34, by varying the output signal from the drive circuit 36. By thus alternating the on time of the transistors, the DC supply comprising a superposed acoustic resonance frequency sine wave component output from the superposing circuit 18 is converted to 400-Hz AC power applied to the 35-W metal halide lamp 1 by the igniter 15.

Figure 10D:
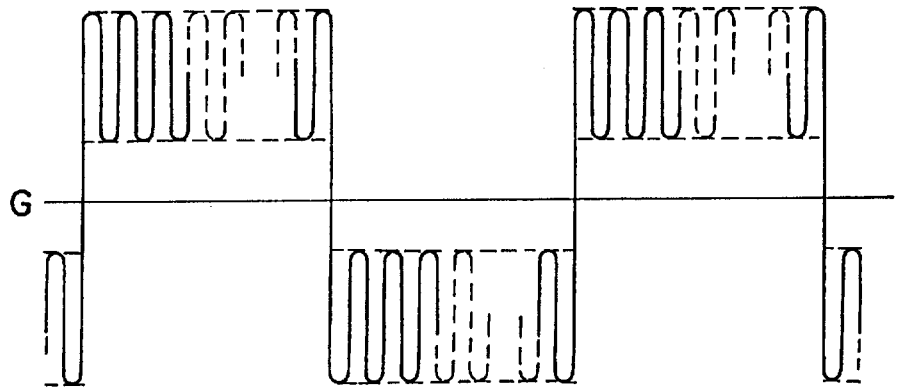

The 400-Hz AC supply output (d) from the rectangular wave conversion circuit 14 is shown in FIG. 10D.

Once the 35-W metal halide lamp 1 is started by means of the igniter 15 applying a high voltage, the discharge lamp operating apparatus 12 thus comprised can supply a composite wave comprising a 400-Hz rectangular wave with a sine wave component of the acoustic resonance frequency for exciting an arc-straightening mode as shown in FIG. 10D. A substantially straight discharge arc free of discoloration can therefore be achieved.

The modulation depth can also be freely adjusted by changing the output voltage of the sine wave power supply 28, i.e., changing the peak-to-peak value $\alpha$. The discharge arc curvature can thus be controlled, and various lighting effects can therefore be achieved.

Embodiment 3

Figure 11:
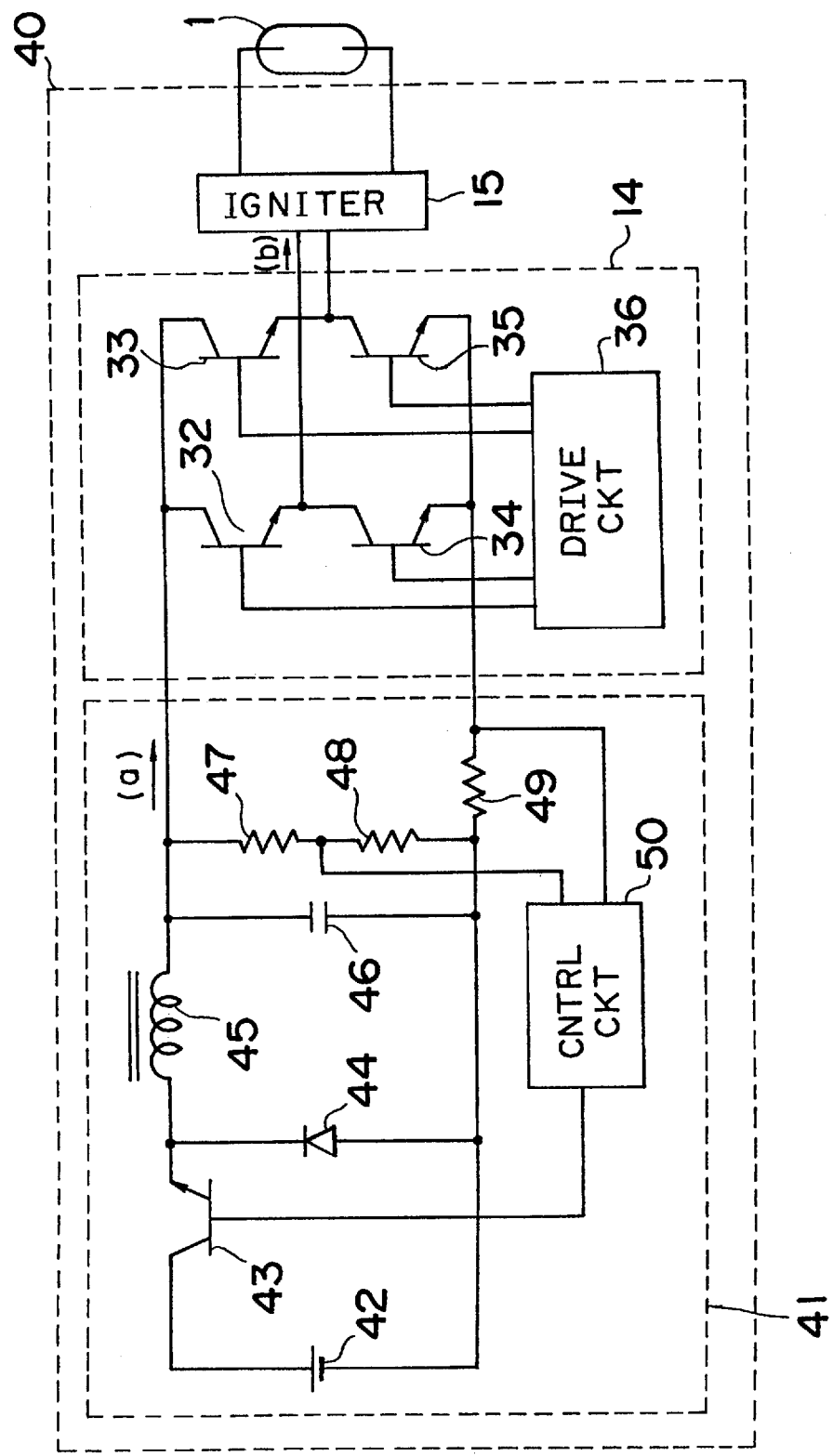
FIG. 11 is a circuit diagram of a discharge lamp operating apparatus according to a third embodiment of the present invention.

FIG. 11 is a block diagram of a discharge lamp operating apparatus 40 according to a third embodiment of the present invention for application with a 35-W metal halide lamp 1, which is identical to the lamp 1 shown in FIG. 7A.

Note that the discharge lamp operating apparatus 40 in this embodiment is for starting and operating the 35-W metal halide lamp 1, and comprises a DC power supply 41, rectangular wave conversion circuit 14, and igniter 15.

The DC power supply 41 outputs a DC waveform superposed with a waveform comprising a frequency component of the acoustic resonance frequency for exciting an arc-straightening mode. The rectangular wave conversion circuit 14 is an inverter circuit for changing the polarity of the output from the DC power supply 41 at a frequency lower than the acoustic resonance frequency. The igniter 15 is a igniter for applying a high voltage sufficient to cause the 35-W metal halide lamp 1 to start discharging.

It should be noted that the rectangular wave conversion circuit 14 and the igniter 15 are identical to those of the second embodiment above. The present embodiment differs from the second embodiment described above in the construction and operation of the DC power supply 41, which are described below.

The DC power supply 41 comprises a voltage step-down chopper circuit comprising DC source 42, a transistor 43 used as a switching element, diode 44, choke coil 45, and capacitor 46, a lamp voltage detector comprising resistances 47 and 48 for detecting a signal representing the lamp voltage, a lamp current detector comprising resistance 49 for detecting a signal representing the lamp current, and a control circuit 50. The control circuit 50 calculates the lamp power from the lamp voltage signal and the lamp current signal, and controls the on/off ratio of transistor 43 to maintain the lamp power at a constant 35 W. The on/off frequency of the transistor 43 is set to 150 kHz, which is the acoustic resonance frequency exciting an arc-straightening mode. The filter circuit comprising choke coil 45 and capacitor 46 is adjusted to pass a 150-kHz frequency component, and the output current from the DC power supply 41 thus has a 150-kHz frequency component.

The DC power supply 41 in this third embodiment produces an output current (a), such as shown in FIG. 12A, and the rectangular wave conversion circuit 14 produces an output current (b), such as shown in FIG. 12B.

As in the first and second embodiments described above, the discharge lamp operating apparatus 40 of the present embodiment can supply a composite wave comprising a 400-Hz rectangular wave with a frequency component of the acoustic resonance frequency for exciting an arc-straightening mode to the 35-W metal halide lamp 1. A substantially straight discharge arc free of discoloration can therefore be achieved.

As described above, the on/off frequency of the transistor 43 can be adjusted to the acoustic resonance frequency (150 kHz) whereby a straight discharge arc can be achieved by simply setting the filter frequency of the choke coil 45 and capacitor 46 to a particular level. As a result, the modulation depth of the rectangular wave can be easily changed as required, and the construction of the discharge lamp operating apparatus is simplified.

It is apparent that the discharge lamps of the preferred embodiments of the present invention described above shall not be limited to 35-W metal halide lamps or 200-W metal halide lamps, and the discharge lamp operating apparatus of the invention can be applied with high pressure mercury vapor lamps, high pressure sodium vapor lamps, and other types of discharge lamps.

It should also be noted that the rectangular wave generator 4 is described above as generating a standard rectangular wave, but shall not be so limited. The rectangular wave generator 4 can also generate trapezoidal waves with a sloping rise and fall, or quasi-rectangular waves.

The rectangular wave conversion circuit 14 can also be otherwise comprised insofar as it can generate a quasi-rectangular wave.

Furthermore, the rectangular wave generator 4 and rectangular wave conversion circuit 14 shall not be limited to generating rectangular waves or quasi-rectangular waves. Specifically, the rectangular wave generator 4 and rectangular wave conversion circuit 14 can output other types of sine waves, triangular waves, stepped waves, or sawtooth waves. It is only necessary that the frequency of the waveform is less than the acoustic resonance frequency for exciting an arc-straightening mode and changes polarity of the waveform having the acoustic resonance frequency. The waveform can further comprise a DC component insofar as the polarity changes, and can be a waveform with asymmetrical negative and positive peaks.

More specifically, any waveform whereby the field produced in the discharge space of the discharge lamp does not flow in one direction, an unbalanced distribution of the fill does not result, and cataphoresis can be avoided, can be used.

Furthermore, while the wave frequency used by the rectangular wave generator 4 and rectangular wave conversion circuit 14 above is 400 Hz, any frequency between 100 Hz and 2 kHz can be used.

In addition, a 150-kHz sine wave generator 3 is used as the AC power supply for outputting a sine wave with a frequency component of the acoustic resonance frequency exciting an arc-straightening mode. The wave generator shall not be limited to producing a sine wave, however, and can produce a triangular wave or sawtooth wave insofar as the wave comprises an acoustic resonance frequency component. This is also true of the sine wave power supply 28.

Changes and variations in the acoustic resonance frequency exciting an arc-straightening mode that arise from aging and variations in the lamp characteristics can also be absorbed by adding a frequency modulation function to the sine wave generator 3 and sine wave power supply 28 so that the generated sine wave can be adjusted to a particular period and width.

The same effect can also be achieved in the third embodiment if the on/off frequency of the transistor 43 can be frequency modulated using a signal from the control circuit 50.

The high frequency supply 17 is also described as comprising a sine wave power supply 28 and choke coil 29 above such that the output current of the sine wave power supply 28 is limited by the impedance of the choke coil 29 to achieve a particular modulation depth. The same effect can be achieved, however, by using a combination of resistors and capacitors in place of the choke coil.

A DC power supply is also achieved using a step-down chopper circuit for outputting DC power with no change in instantaneous value. The same effect can be achieved using other circuit designs, however, including a voltage step-up chopper circuit and an inverting chopper circuit.

In addition, the control circuits 27 and 50 are comprised to control the on:off ratio of transistors 20 and 43 so that the lamp power remains a constant 35 W. To compensate for light output when the lamp is started, however, the control circuits 27 and 50 can also operate to supply power exceeding the rated operating power during initial discharge lamp operation. The control circuits 27 and 50 can also be constructed to variably control the lamp characteristics to achieve dimming control and other special effects.

It is also apparent that while the superposing circuit 18 described as comprising a choke coil 30 and capacitor 31, other configurations can be alternatively used.

The DC power supply 41 can also be constructed using a step-up chopper circuit, inverting chopper circuit, forward converter, or other circuit design insofar as a DC output superposed with an acoustic resonance frequency component can be output.

While a transistor 43 is used as the switching component, it is also apparent that an FET, thyristor, IBGT, or other element can be alternatively used.

A discharge lamp operating apparatus according to the present invention thus energizes a discharge lamp using a composite wave having a waveform with a frequency component of the acoustic resonance frequency exciting an arc-straightening mode and a waveform of a frequency lower than the acoustic resonance frequency whereby the polarity of the waveform having the acoustic resonance frequency changes. The discharge lamp operating apparatus of the invention can thus energize a discharge lamp with a substantially straight discharge arc, and thereby eliminate discoloration and color variations resulting from discharge arc curvature.

In other words, according to the present invention, the sine wave generator 3, 28 or 41 can be considered as a generator for generating a first wave signal having a waveform with an acoustic resonance frequency f2 exciting a discharge arc straightening mode. Here it is noted that the first wave signal has a center line at a constant level.

According to one aspect of the invention, rectangular wave generator 4 and wave synthesizer 5 in FIG. 7A, or DC supply 16 and superposing circuit 18 and rectangular wave conversion circuit 14 in FIG. 9 or rectangular wave conversion circuit 14 in FIG. 11 can be considered as a modifier for modifying the first wave signal to vary periodically such that the center line of the first wave signal varies alternately to change the polarity of the center line at a modifying frequency f1. The modifying frequency f1 is smaller than the acoustic resonance frequency f2. The modulator produces a modulated signal which is the composite signal.

According to another aspect of the invention, rectangular wave generator 4 and switch 6 in FIG. 7B can be considered as a modulator for modulating the first wave signal to appear periodically such that the first wave signal and a second wave signal occurring alternately in a time sharing manner. The second wave signal has a frequency smaller than the acoustic resonance frequency.

The invention being thus described, it is apparent that the same may be varied in many ways. Such variations are not to be regarded as a departure from the spirit and scope of the invention, and all such modifications as would be obvious to one skilled in the art are intended to be included within the scope of the following claims.

What is claimed is:

1. A discharge lamp operating apparatus for operating a discharge lamp having a glass envelope defining a discharge space for a discharge arc, the apparatus comprising:

a generator for generating a first wave signal having a waveform with a frequency component of an acoustic resonance frequency to excite a mode straightening the discharge arc, said first wave signal having a center line at a constant level; and a modulator for modulating said first wave signal to vary periodically such that said center line varies alternately to change the polarity thereof at a modulating frequency, said modulating frequency being lower than said acoustic resonance frequency, said modulator producing a modulated signal.

2. A discharge lamp operating apparatus of claim 1, wherein said acoustic resonance frequency is determined by a sound velocity in the discharge space, and the length of the discharge space intersecting the discharge arc.

3. A discharge lamp operating apparatus of claim 1, wherein said discharge lamp comprises a filler selected from one of a metal halide and mercury.

4. A discharge lamp operating apparatus of claim 1, wherein a modulation depth given by a ratio $\alpha/\beta$ is not less than 0.3 where $\alpha$ is a peak-to-peak value of said first wave signal, and $\beta$ is an effective value of said modulated signal.

5. A discharge lamp operating apparatus of claim 4, wherein said modulation depth $\alpha/\beta$ is not less than 0.8.

6. A discharge lamp operating apparatus of claim 1, wherein said center line is varied according to a quasi-rectangular wave.

7. A discharge lamp operating apparatus of claim 6, wherein The frequency of said quasi-rectangular wave is between 100 Hz and 2 kHz.

8. A discharge lamp operating apparatus of claim 1, wherein said first wave signal has its center line being approximately at a ground level.

9. A discharge lamp operating apparatus of claim 8, wherein said modulator comprises a generator for generating a waveform having a frequency equal to or less than the acoustic resonance frequency with a polarity thereof being changed, and a wave synthesizer.

10. A discharge lamp operating apparatus of claim 8, wherein said modulator comprises a DC power supply for producing a DC signal, a superposing circuit for superposing said first wave signal with said DC signal for producing a DC superposed first wave signal, and an inverter circuit for converting said DC superposed first wave signal to said modulated signal.

11. A discharge lamp operating apparatus of claim 1, wherein said first wave signal has its center line at a predetermined DC level.

12. A discharge lamp operating apparatus of claim 11, wherein said modulator comprises an inverter circuit for converting said first wave signal to said modulated signal.

13. A discharge lamp operating apparatus for operating a discharge lamp having a glass envelope defining a discharge space, the apparatus comprising:

a generator for generating a first wave signal having a waveform with a frequency component of an acoustic resonance frequency to excite a mode straightening the discharge arc, said first wave signal having a center line at a constant level; and a modulator for modulating said first wave signal to appear periodically such that said first wave signal and a second wave signal occur alternately in a time sharing manner, said second wave signal having a frequency lower than said acoustic resonance frequency.

14. A discharge lamp operating method for operating a discharge lamp having a glass envelope defining a discharge space, said method comprising:

generating a first wave signal having a waveform with a frequency component of an acoustic resonance frequency to excite a mode straightening the discharge arc, said first wave signal having a center line at a constant level; and modulating said first wave signal to vary periodically such that said center line varies alternately to change the polarity thereof at a modulating frequency, said modulating frequency being lower than said acoustic resonance frequency, said modulator producing a modulated signal.

15. A discharge lamp operating method of claim 14, wherein a curvature of said discharging arc is controlled by a peak-to-peak value $\alpha$ of said first wave signal.

16. A discharge lamp operating method for operating a discharge lamp having a glass envelope defining a discharge space, said method comprising:

generating a first wave signal having a waveform with a frequency component of an acoustic resonance frequency to excite a mode straightening the discharge arc, said first wave signal having a center line at a constant level; and modulating said first wave signal to appear periodically such that said first wave signal and a second wave signal occur alternately in a time sharing manner, said second wave signal having a frequency lower than said acoustic resonance frequency.

17. A discharge lamp operating method of claim 16, wherein a curvature of said discharging arc is controlled by a ratio of an occurring period of said first wave signal within a unit time.

* * * * *